(12) United States Patent
Goll et al.

(10) Patent No.: US 8,087,306 B2
(45) Date of Patent: Jan. 3, 2012

(54) SENSOR ARRANGEMENT FOR MEASURING A TORQUE

(75) Inventors: Manfred Goll, Glauburg (DE); Markus Bastian, Mainz (DE)

(73) Assignee: Continental Teves AG & Co. oHG (DE)

( * ) Notice: Subject to any disclaimer, the term of this patent is extended or adjusted under 35 U.S.C. 154(b) by 264 days.

(21) Appl. No.: 12/517,993

(22) PCT Filed: Dec. 7, 2007

(86) PCT No.: PCT/EP2007/063532
§ 371 (c)(1),
(2), (4) Date: Jun. 5, 2009

(87) PCT Pub. No.: WO2008/068334
PCT Pub. Date: Jun. 12, 2008

(65) Prior Publication Data
US 2010/0313681 A1 Dec. 16, 2010

(30) Foreign Application Priority Data

Dec. 7, 2006 (DE) .......................... 10 2006 058 060
Dec. 7, 2007 (DE) .......................... 10 2007 059 364

(51) Int. Cl.
*G01L 3/00* (2006.01)
(52) U.S. Cl. .......... 73/862.335; 73/862.331; 73/862.325
(58) Field of Classification Search ........... 73/862.331–862.336
See application file for complete search history.

(56) References Cited

U.S. PATENT DOCUMENTS

| | | | |
|---|---|---|---|
| 4,984,474 A | 1/1991 | Matsushima et al. | |
| 6,758,105 B2 * | 7/2004 | Viola et al. | 73/862.08 |
| 6,912,923 B2 * | 7/2005 | Froehlich et al. | 73/862.333 |
| 6,928,887 B2 * | 8/2005 | Nakane et al. | 73/862.331 |
| 6,928,888 B2 * | 8/2005 | Nakane et al. | 73/862.332 |
| 6,988,422 B2 * | 1/2006 | Sugimura et al. | 73/862.334 |
| 7,021,160 B2 * | 4/2006 | Pattok et al. | 73/862.332 |
| 7,028,545 B2 | 4/2006 | Gandel et al. | |
| 7,051,602 B2 * | 5/2006 | Nakane et al. | 73/862.333 |
| 7,117,753 B2 * | 10/2006 | Nakatani et al. | 73/862.331 |
| 7,174,795 B2 * | 2/2007 | Feng et al. | 73/862.332 |
| 7,246,531 B2 * | 7/2007 | Nakane et al. | 73/862.332 |
| 7,287,440 B1 * | 10/2007 | Maehara | 73/862.322 |
| 7,415,898 B2 * | 8/2008 | Ishihara et al. | 73/862.331 |
| 7,428,847 B2 * | 9/2008 | Osuka et al. | 73/862.331 |
| 7,509,883 B2 * | 3/2009 | Murakami et al. | 73/862.331 |

(Continued)

FOREIGN PATENT DOCUMENTS

DE 10346000 A1 4/2004

(Continued)

*Primary Examiner* — Lisa Caputo
*Assistant Examiner* — Jonathan Dunlap
(74) *Attorney, Agent, or Firm* — RatnerPrestia (57) ABSTRACT

A sensor arrangement for measuring a torque acting on a shaft, wherein the shaft has a first shaft section and a second shaft section and these two shaft sections can be rotated relative to one another, including at least one magnetic encoder arranged on the first shaft section, and a stator arranged on the second shaft section, wherein the stator has two stator elements, each with protruding fingers, and the stator elements are assigned respectively or jointly a flux concentrator which leads the magnetic field to be detected, generated by the magnetic encoder, directly or indirectly to at least one magnetic field sensor element, wherein the at least one flux concentrator is fixed to a carrier element embodied in elastic fashion at least in part.

9 Claims, 12 Drawing Sheets

U.S. PATENT DOCUMENTS

| | | | |
|---|---|---|---|
| 7,555,963 B2* | 7/2009 | Maehara | 73/862.333 |
| 7,562,590 B2* | 7/2009 | Tokumoto et al. | 73/862.331 |
| 7,784,365 B2* | 8/2010 | Masson et al. | 73/862.333 |
| 7,886,619 B2* | 2/2011 | Kaoku et al. | 73/862.331 |
| 2004/0074314 A1 | 4/2004 | Nakane et al. | |
| 2004/0099064 A1 | 5/2004 | Viola et al. | |
| 2004/0194560 A1 | 10/2004 | Froehlich et al. | |
| 2004/0250631 A1 | 12/2004 | Pattok et al. | |
| 2005/0126310 A1 | 6/2005 | Sugimura et al. | |
| 2005/0150312 A1* | 7/2005 | Nakatani et al. | 73/862.331 |
| 2005/0172732 A1 | 8/2005 | Feng et al. | |
| 2005/0223820 A1* | 10/2005 | Murakami et al. | 73/862.331 |
| 2005/0241414 A1* | 11/2005 | Nakane et al. | 73/862.333 |
| 2005/0247138 A1* | 11/2005 | Nakane et al. | 73/862.331 |
| 2006/0021451 A1* | 2/2006 | Ishihara et al. | 73/862.331 |
| 2007/0209450 A1* | 9/2007 | Maehara | 73/862.332 |
| 2007/0295109 A1* | 12/2007 | Tokumoto et al. | 73/862.331 |
| 2008/0092671 A1* | 4/2008 | Maehara | 73/862.331 |
| 2008/0295612 A1 | 12/2008 | Rachui et al. | |

FOREIGN PATENT DOCUMENTS

| | | |
|---|---|---|
| DE | 10353731 A1 | 6/2004 |
| DE | 10316124 A1 | 10/2004 |
| DE | 102004023801 A1 | 8/2005 |
| DE | 102004055124 A1 | 5/2006 |
| DE | 102005018286 A1 | 10/2006 |
| DE | 102005038514 A1 | 2/2007 |
| EP | 1584908 A2 | 10/2005 |
| WO | WO02/071019 A1 | 9/2002 |

* cited by examiner

SENSOR ARRANGEMENT FOR MEASURING A TORQUE

CROSS REFERENCE TO RELATED APPLICATIONS

This application is the U.S. national phase application of PCT/EP2007/063532, filed Dec. 7, 2007, which claims priority to German Patent Application No. 102006058060.5, filed Dec. 7, 2006 and German Patent Application No. 102007059364.5, filed Dec. 7, 2007, the contents of such applications being incorporated by reference herein.

BACKGROUND OF THE INVENTION

1. Field of the Invention

The invention relates to a sensor arrangement for measuring a torque acting on a shaft, and to the use of the sensor arrangement as a torque and/or angle sensor in the steering of a motor vehicle.

2. Description of the Related Art

Document WO 02/071019 A1 proposes a position sensor for measuring the torque of a steering column, said position sensor comprising a magnetic multipole encoder ring and a magnetic stator with two ferromagnetic wheels, including a plurality of intermeshing teeth. In this case, the two ferromagnetic wheels are coupled via an air gap to additional flux concentrators or collectors, which feed the magnetic field to a magnetic field sensor element. In this case, the relative positioning of the ferromagnetic wheels, which function as stator elements of the position sensor, with respect to the flux concentrators has proved to be relatively difficult with regard to satisfying relatively high accuracy requirements made of the torque measurement. The precise setting of an air gap between stator element and flux concentrator is made more difficult by component and manufacturing tolerances.

SUMMARY OF THE INVENTION

The invention relates to an object of proposing a sensor arrangement for measuring a torque acting on a shaft with increased measurement precision by virtue of the fact that, in particular, the air gap between stator element and flux concentrator is set relatively accurately in each case.

The invention relates to the concept of increasing the measurement precision of the sensor arrangement by means of fixing the at least one flux concentrator to an at least partly elastic or flexible carrier element.

The magnetic encoder and also the stator are sent in each case directly or indirectly on the two shaft sections.

A flux concentrator is preferably understood to be a collector or a collector plate.

The first and the second shaft section are preferably connected to one another by means of a torsion rod or coupled directly or indirectly to one another and rotatably relative to one another.

Preferably, the two shaft sections are in each case embodied in the form of sleeves fixed on the shaft or on the torsion element.

The stator elements and the at least one flux concentrator are expediently at least partly formed from soft-magnetic material. In this case, the stator elements are particularly preferably permeated at least in part by the magnetic field generated by the magnetic encoder.

Preferably, one or both shaft sections are mounted directly or indirectly rotatably and the torque acting on the shaft brings about a relative rotation of the two shaft sections with respect to one another, wherein the two partial shafts coupled by means of the sensor arrangement are connected to the two shaft sections by welding and/or adhesive bonding and/or pinning and/or a splined shaft fit and/or some other type of connection.

A magnetic field sensor element is understood to be a magnetoelectric transducer element, preferably a Hall element, or a magnetoresistive sensor element. Such a magnetic field sensor element has, in particular, an integrated electronic signal processing circuit.

The magnetic encoder is expediently an encoder ring and in particular embodied integrally and in such a way that both stator elements are assigned to it. As an alternative, the sensor arrangement preferably has two or more magnetic encoders or encoder rings arranged alongside one another on the first shaft section. Particularly preferably, the magnetic encoder is alternately magnetized or is a multipole encoder.

The stator elements preferably each comprise a ring that protrudes radially, in particular with respect to the shaft sections. In this case, each stator element is assigned a flux concentrator fixed to a carrier element, wherein the carrier element has at least one centering device embodied in such a way that it can at least partly encompass the ring of the assigned stator element for the precise, in particular substantially centered, alignment between stator element and carrier element. It is thereby possible to carry out in particular the relative alignment between stator element and carrier element in combination with the at least partly elastic embodiment of the carrier element. In this case, the at least one carrier element is substantially fixedly connected to a housing or a housing part of the sensor arrangement. In this case, particularly preferably, the centering device is embodied in such a way that it at least partly encompasses the ring of the respectively assigned stator element in such a way that centering device and ring can form or form a press fit. Especially preferably, the at least one carrier element has an expanding recess, into which an expanding element is at least partly inserted, wherein at least one centering device of the carrier element is at least partly widened or dilated thereby, whereby ring and carrier element are embodied and arranged in each case contactlessly with respect to one another.

A centering device is also preferably understood to be a clip-like embodiment or a centering recess. In particular, at least one centering device is embodied as a slotted press fit and/or tongs-type rim and/or clip.

It is expedient for the sensor arrangement to have two flux concentrators or one flux concentrator assigned jointly to the stator elements. In this case, the one or the two flux concentrators are fixed in particular to a respective or a common carrier element.

The sensor arrangement expediently comprises especially preferably two carrier elements, which are fixedly connected to the housing of the sensor arrangement, wherein the carrier elements are aligned for this purpose in each case by means of the press fit of the ring of the stator element in the centering device of the carrier element. The component and installation accuracies are substantially irrelevant with regard to this relative alignment between in each case a stator element and a carrier element. Moreover, the centering device of each carrier element is widened or dilated by at least one expanding element in an expanding recess in the carrier element in such a way that an air gap which is substantially defined and in particular symmetrical with respect to both stator elements and substantially free of play is thereby set between respective stator element and flux concentrator, whereby a relatively high measurement accuracy of the sensor arrangement is set, which can be achieved in conjunction with relatively low and hence cost-effective tolerance requirements imposed on component and manufacturing quality.

The at least one carrier element is preferably embodied as an elastic clip with two fixing devices for fixing to a housing, at least one centering device and at least one expanding recess.

The expanding element is expediently embodied as an expanding or round bolt or expanding wedge. The expanding elements of one carrier element or of both carrier elements are particularly preferably connected to one another and form an expanding module. An increased precision of the at least partial fitting of the expanding elements into the respective expanding recesses can thereby be achieved, whereby the air gaps between stator elements and flux concentrators can be set even more uniformly and more accurately with regard to symmetry, which enables an even higher measurement accuracy.

The possible press fit between ring and centering recess is expediently canceled by at least one expanding element introduced at least partly into an expanding recess, whereby ring and assigned centering recess are embodied and arrangement contactlessly with respect to one another.

It is preferred for the stator elements to be connected to one another by means of a common connecting element, in particular composed of injection-molded plastic. The relative alignment of the two stator elements with respect to one another is thereby set relatively precisely and fixedly.

The ring and the fingers of a stator element are in each case preferably at least partly formed from soft-magnetic material, wherein the fingers are fixed to the ring and are aligned in a manner protruding from the ring axially with respect to the shaft and, particularly preferably, are embodied in substantially trapezoidal fashion. This embodiment has proved to be particularly suitable for relatively precise conduction of the magnetic field.

The magnetic encoder or encoder ring expediently has at least two encoder tracks. In this case, the sensor arrangement correspondingly has at least two magnetic field sensor elements, wherein the stator with the two stator elements is assigned to at least one first encoder track and at least one first magnetic field sensor element is assigned to said stator. In this case, the at least second encoder track is assigned to at least one second magnetic field sensor element for measuring a relative angle of rotation between the two shaft sections. Said angle serves in particular for detecting a steering angle.

The sensor arrangement preferably has a housing, to which the carrier elements are fixed and which, in particular for electromagnetic shielding, is at least partly formed from magnetically permeable material. Particularly preferably, the housing has a cover composed of magnetically permeable steel. Especially preferably, at least one or two magnetic field sensor elements, wherein a first element is in particular a Hall element for detecting the torque and the other element is a magnetoresistive magnetic field element for detecting a relative angle of rotation between the two shaft sections, are arranged from the inner side of the housing cover. In addition, in particular an evaluation circuit is arranged there, or the two magnetic field sensor elements and also the electronic circuit are arranged on a common circuit board or embodied as an integrated circuit.

It is expedient for the magnetic encoder or encoder ring to be embodied integrally. In particular, the magnetic encoder ring is embodied in such a way that it has at least two encoder tracks offset by substantially 90° with respect to one another, particularly preferably at least one encoder track running substantially parallel to the lateral surface of the shaft and at least one further encoder track running substantially perpendicular thereto.

It is preferred to combine embodiments presented above with one another and, in particular, to supplement them to form a self-contained system. In this case, the sensor arrangement is expediently constructed in modular fashion.

The sensor arrangement expediently has at least one device with which the at least one carrier element is opened or expanded by the expanding elements during assembly.

Preferably, use is made of a sensor carrier composed of plastic with an incorporated steel part for shielding. The sensor carrier is embodied in particular as a carrier for the printed circuit board and has an integrated connector and/or an integrated cable. The sensor carrier is particularly preferably suitable for the pressing-in of the expanding elements during assembly and is embodied accordingly.

It is preferred for the sensor carrier to be embodied from a combination of a fixed and a flexible printed circuit board.

The embodiments and modules proposed have in part the following advantages:

Identical distances between the functional stator and flux concentrator assemblies by self-centering by means of the flux concentrator assembly with the at least one carrier element by expanding mechanism. Contactless course between flux concentrators and stator elements (that is to say no further friction). The flux concentrators can be positioned even more accurately in the case of integration into a housing. Simple mounting of the flux concentrator assembly and sensor assembly. A small number of components required. Good shielding of the magnetic field by a closed-off steel housing.

The sensor arrangement is preferably embodied as a pre-tested finished assembly and thus enables relatively simple connection to a steering gear. The prior art often proposes essentially only operative principles or the possible geometrical configuration of associated individual functional components, but not the further configuration thereof to form a finished, separate sensor arrangement which, however, can at the same time be assembled in particular in a relatively simple manner.

The invention additionally relates to the use of a sensor arrangement according to aspects of the invention as a torque and/or angle sensor in the steering of a motor vehicle. In particular, integration of said sensor arrangement into a steering gear is provided in this case.

The sensor arrangement according to aspects of the invention is provided for use in automation technology and also in machines and generators, that is to say also in motor vehicles for measuring a torque and optionally an angle of rotation of a shaft. In this case, a use in motor vehicles is expediently provided, in particular in steering systems. The sensor arrangement according to aspects of the invention is provided for use in systems which have at least one shaft whose torque is to be detected. In this case, an arrangement of the sensor arrangement on a torsion element that connects two shaft segments to one another is provided, in particular. Particularly preferably, motor vehicles and systems appertaining to automation technology are proposed as a field of use for the sensor arrangement. The use in the steering system of a motor vehicle is particularly preferably provided.

Further preferred embodiments emerge from the following description of exemplary embodiments with reference to figures.

BRIEF DESCRIPTION OF THE DRAWINGS

In schematic exemplary illustration.

DETAILED DESCRIPTION OF THE PREFERRED EMBODIMENTS

Figure 1:
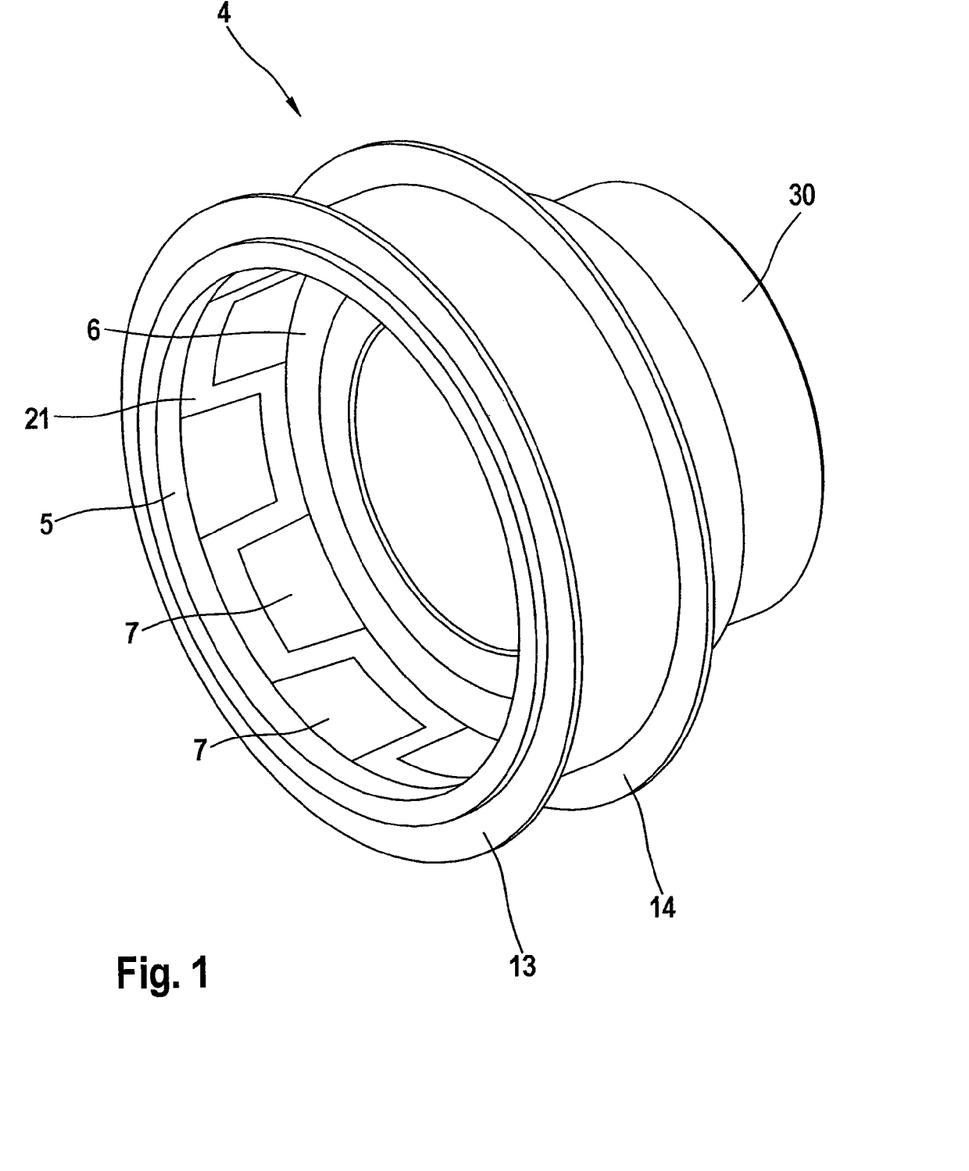
FIG. 1 shows an exemplary stator.

FIG. 1 depicts an exemplary stator 4 having two stator elements 5 and 6, which comprises a connecting element 21 composed of plastic, the two stator elements 5, 6 being fixed by said connecting element. Stator elements 5, 6 are by way of example ferromagnetic wheels with axially protruding fingers 7 which are integrally fixed to a respective ring 13, 14 that is at least also radially aligned. Stator elements 5, 6 are embedded by way of example as inserts in an injection-molded plastic connecting element 21 with bush or sleeve 30. The stator elements 5, 6 with the respective rings 13, 14 transmit or conduct the magnetic field generated by the magnetic encoder (not illustrated).

Figure 2:
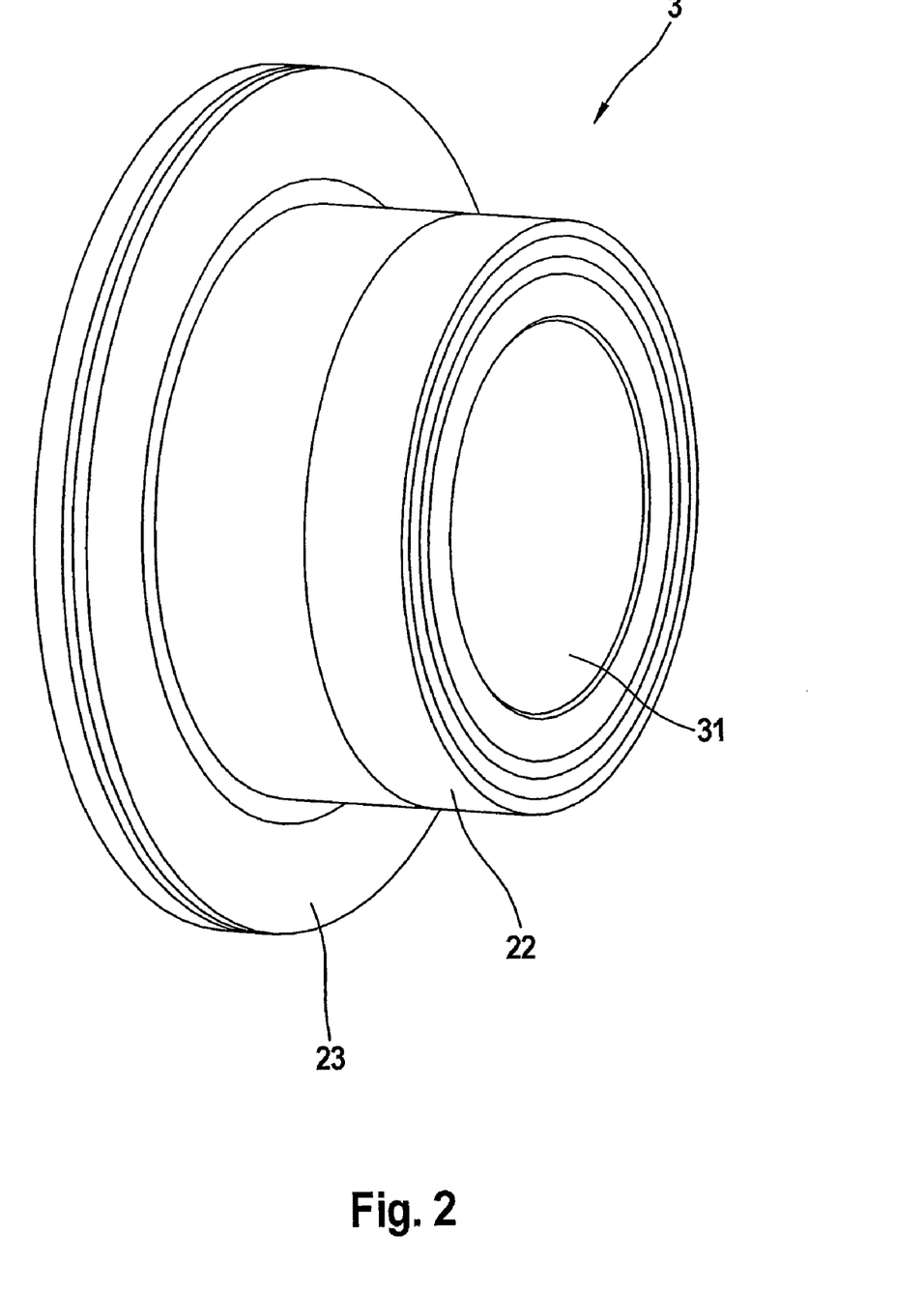
FIG. 2 shows an exemplary encoder.

FIG. 2 shows an exemplary embodiment of a magnetic encoder 3, which is embedded by way of example as an insert in a plastic element by means of an injection-molding process and which has a bush or sleeve 31. In this case, the magnetic encoder ring is embodied integrally and has two encoder tracks 22 and 23, of which encoder track 22 is assigned to the stator elements and thus to torque detection and encoder track 23 is assigned to steering angle detection. The exemplary encoder assembly is embodied with respect to the sleeve 31 in such a way that it can be connected to the input shaft.

Figure 3:
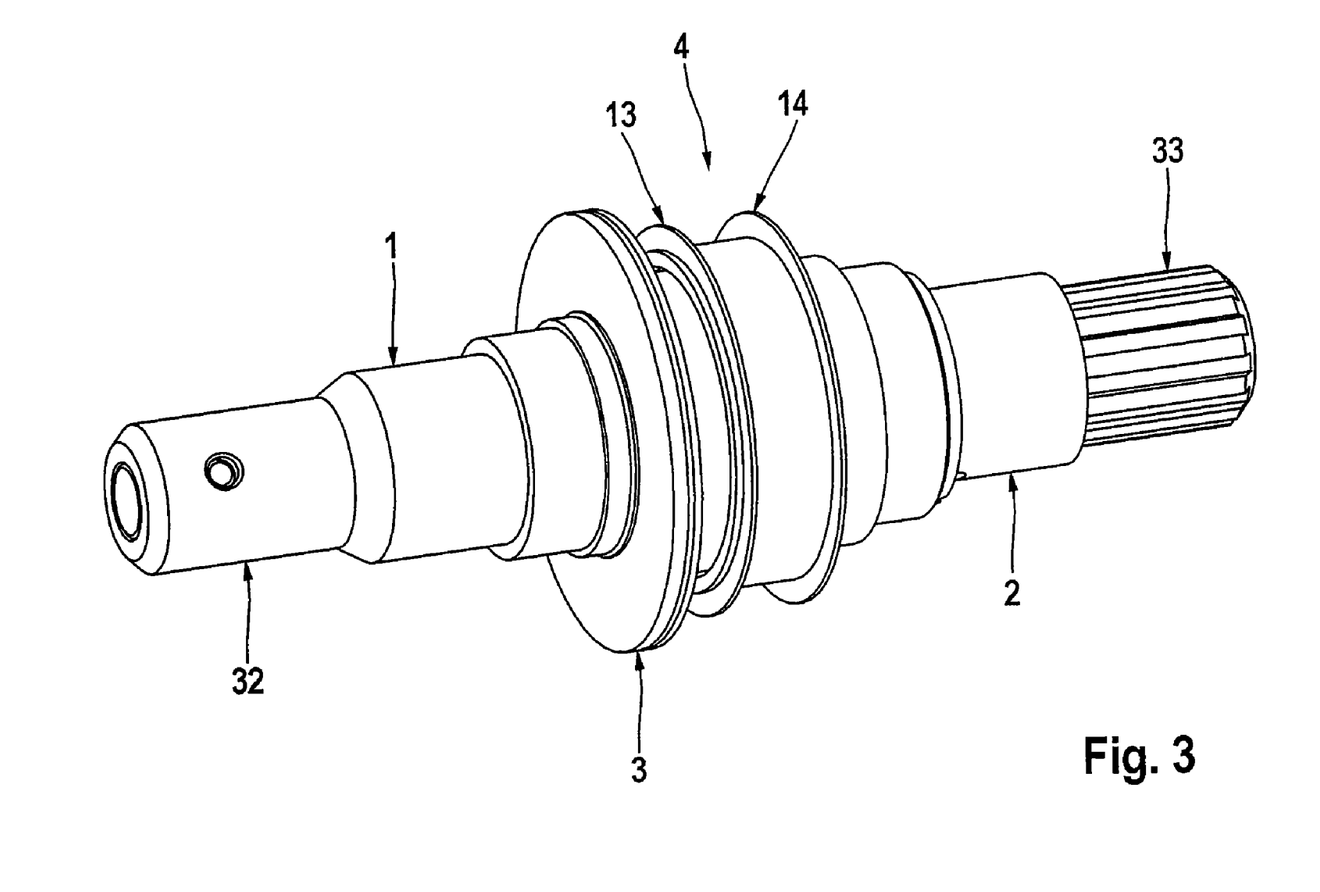
FIG. 3 shows an exemplary sensor arrangement with a magnetic encoder and a stator, each fixed on a shaft section.

FIG. 3 illustrates the embodiment of the two shaft sections 1, 2 of an exemplary, preassembled sensor arrangement, wherein an input shaft (not illustrated) is assigned a connection with universal joint 32 on the part of the magnetic encoder 3 or the encoder assembly and an output shaft (not illustrated) is assigned a connection with worm 33 or splined shaft on the part of the stator 4 or the stator assembly. Rings 13 and 14 of the two stator elements of the stator 4 are likewise depicted. The two shaft sections 1 and 2 are connected to one another by a torsion rod (not illustrated) and can therefore be rotated relative to one another. Encoder 3 is by way of example mounted as a component on a shaft section or is fixedly connected thereto.

Figure 4:
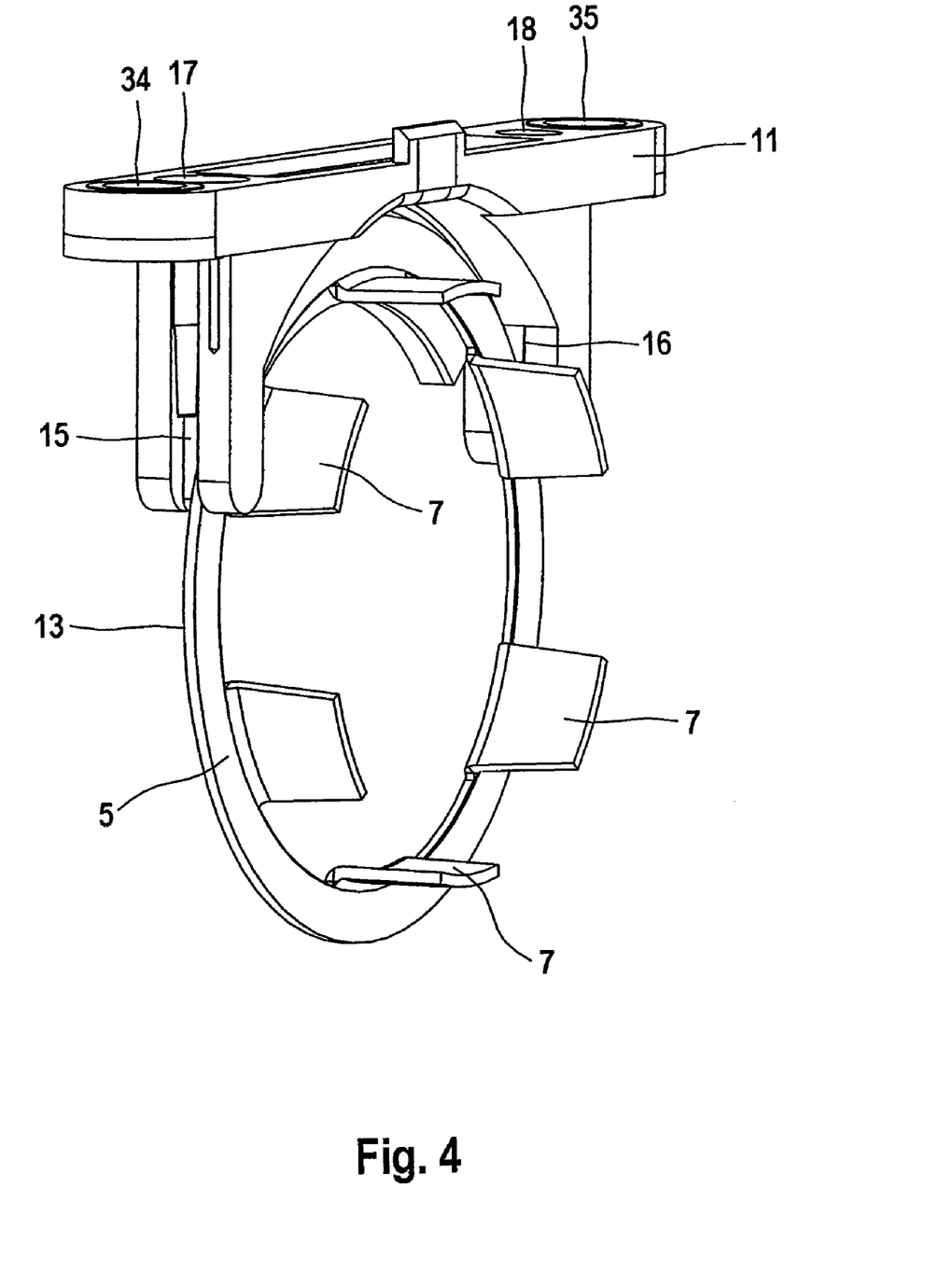
FIG. 4 shows an exemplary embodiment of a stator element and a carrier element.

FIG. 4 illustrates by way of example carrier element 11 with stator element 5 assigned thereto. A flux concentrator is fixed to carrier element 11, said flux concentrator being concealed by stator element 5, comprising the fingers 7. Carrier element 11 comprises centering devices 15, 16, which are embodied by way of example as elastic clips. In this case, carrier element 11 has two fixing devices 34, 35 in the form of two holes for fixing to a housing. Furthermore, carrier element 5 has two centering devices 15, 16 embodied in clip-type fashion and also two expanding recesses 17 and 18. Ring 13 of the stator element 5 is in each case partly encompassed by centering devices 15 and 16. Since, in the exemplary depiction, no expanding elements are introduced in expanding recesses 17 and 18, and ring 13 and centering devices 15, 16 are embodied as a press fit, ring 13 is clamped in the centering devices 15 and 16. By this means, during the manufacture of the sensor arrangement, the carrier elements can be aligned with the flux concentrators and then be fixed to a housing or housing part in a correspondingly aligned manner.

Figure 5:
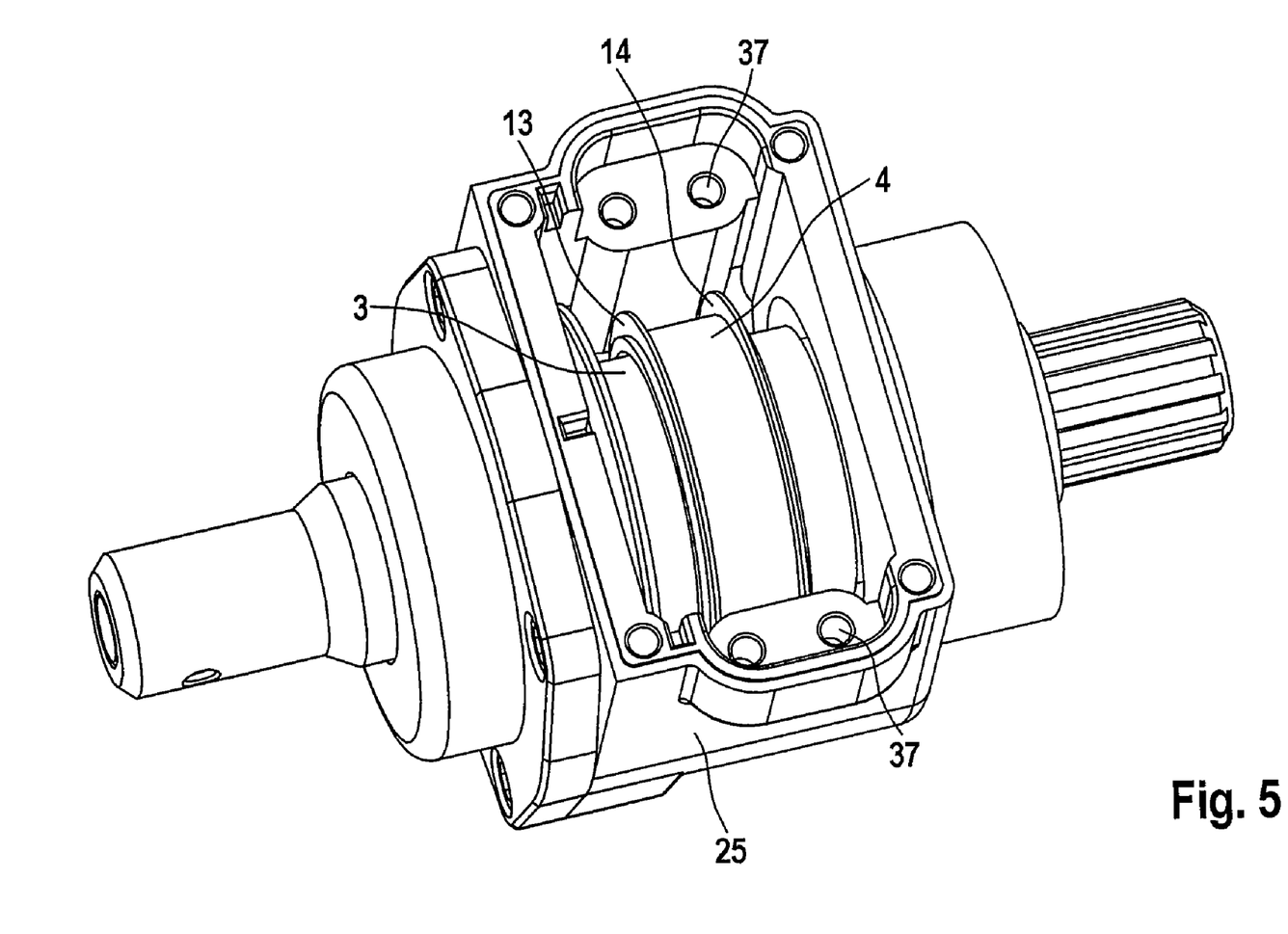
FIGS. 5, 6 show exemplary sensor arrangements with a housing.

FIG. 5 illustrates an exemplary sensor arrangement comprising a housing 25. Through the upper opening it is possible to see stator 4 with rings 13, 14 and also a part of the encoder 3, wherein the encoder track whose magnetic field principally permeates the stator is encompassed by stator 4 and thereby concealed. Housing 25 has holes 37 for fixing carrier elements (not illustrated) to which a flux concentrator is fixed in each case.

Figure 6:
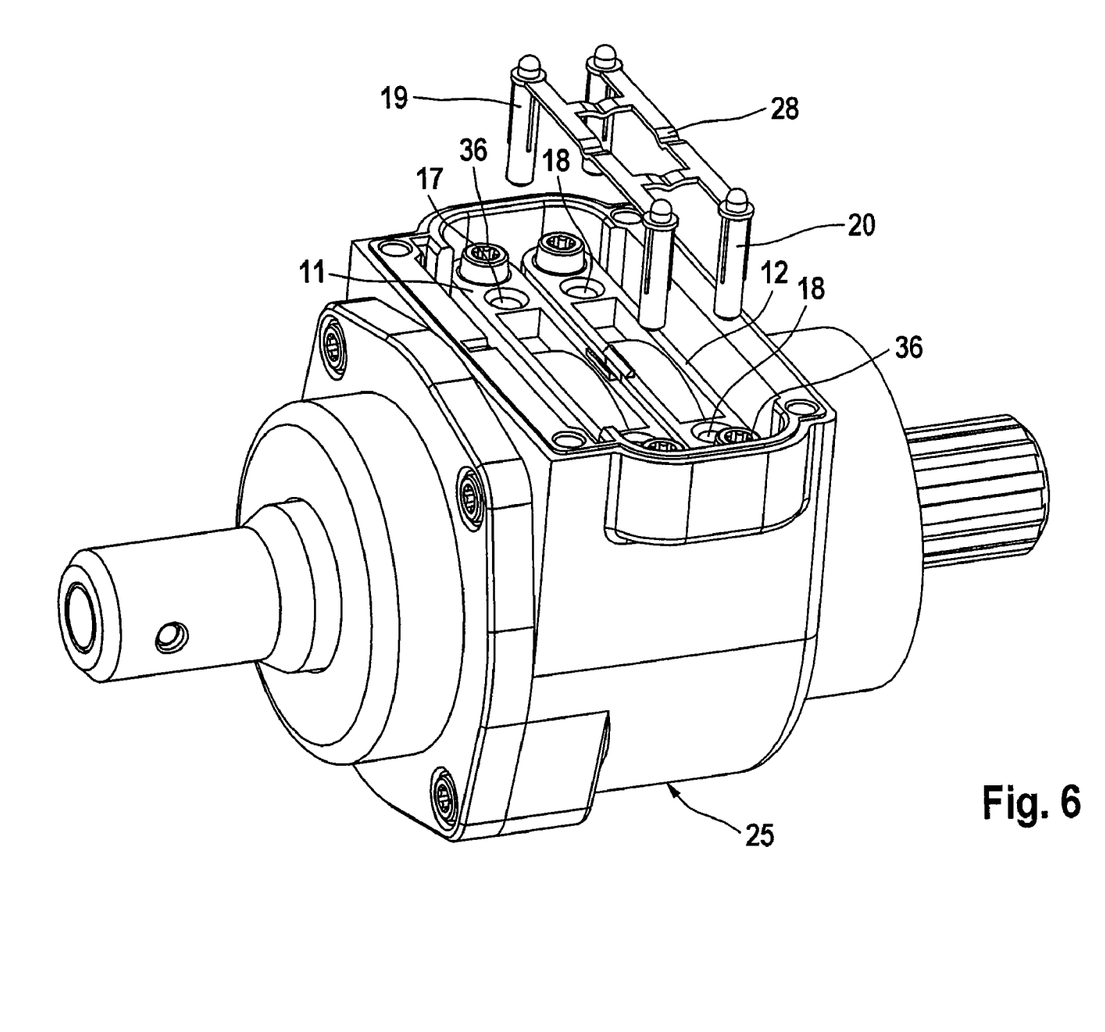

As shown by way of example in FIG. 6, carrier elements 11, 12 are fixed to housing 25 by means of screws 36. In this case, carrier elements 11, 12 are aligned by way of example, as illustrated in FIG. 4, on the rings of the stator elements. In addition, expanding elements 19, 20 assigned to the expanding recesses 17, 18 of the carrier elements are introduced into said expanding recesses 17, 18, whereby the centering devices (not illustrated) of carrier elements 11 and 12 are dilated or expanded. A substantially defined air gap is thereby formed in each case between flux concentrators and stator elements (not illustrated) and also between carrier elements 11, 12 and stator elements. Expanding elements 19, 20 are embodied by way of example as expanding bolts and connected to one another to form a common expanding module 28 which can be introduced relatively precisely into the expanding recesses 17 and 18.

Consequently, during operation, the stator can rotate contactlessly, or be deflected rotationally. The expanding elements 19, 20 are optionally by way of example firstly inserted into the expanding recesses 17, 18 and, upon the mounting of a cover (not illustrated here), are pressed in further to a defined degree, whereby the centering devices are expanded or dilated in a defined manner.

Figure 7:
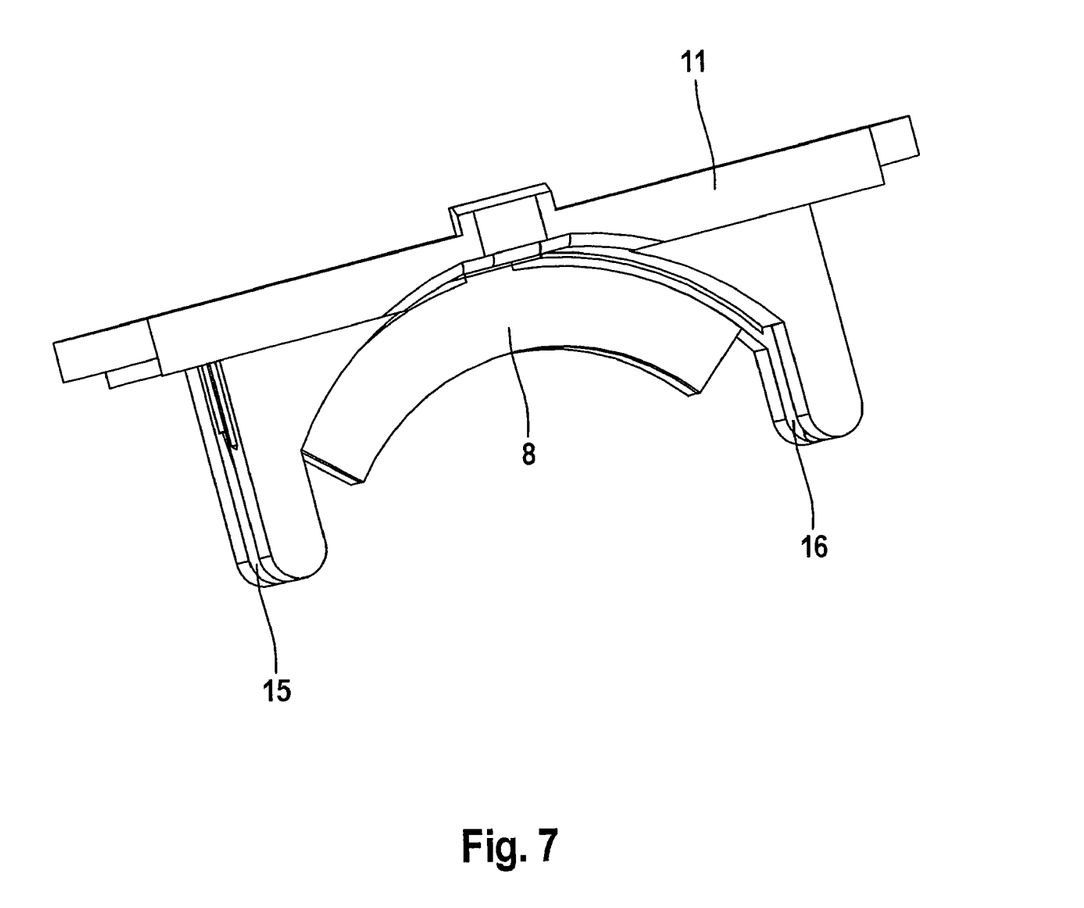
FIG. 7 shows an exemplary embodiment of a flux concentrator with carrier element.

FIG. 7 shows exemplary carrier element 11, which is embodied as an injection-molded part composed of plastic and has a flux concentrator 8 or a collector plate as an insert. The flux concentrator 8 can also alternatively be applied to the carrier element 11 or the plastic carrier as a coating. Flux concentrator 8 is aligned or centered on the ring (not illustrated) of the stator element by means of the two centering devices 15 and 16 illustrated, which are in each case embodied as clip parts.

Figure 8:
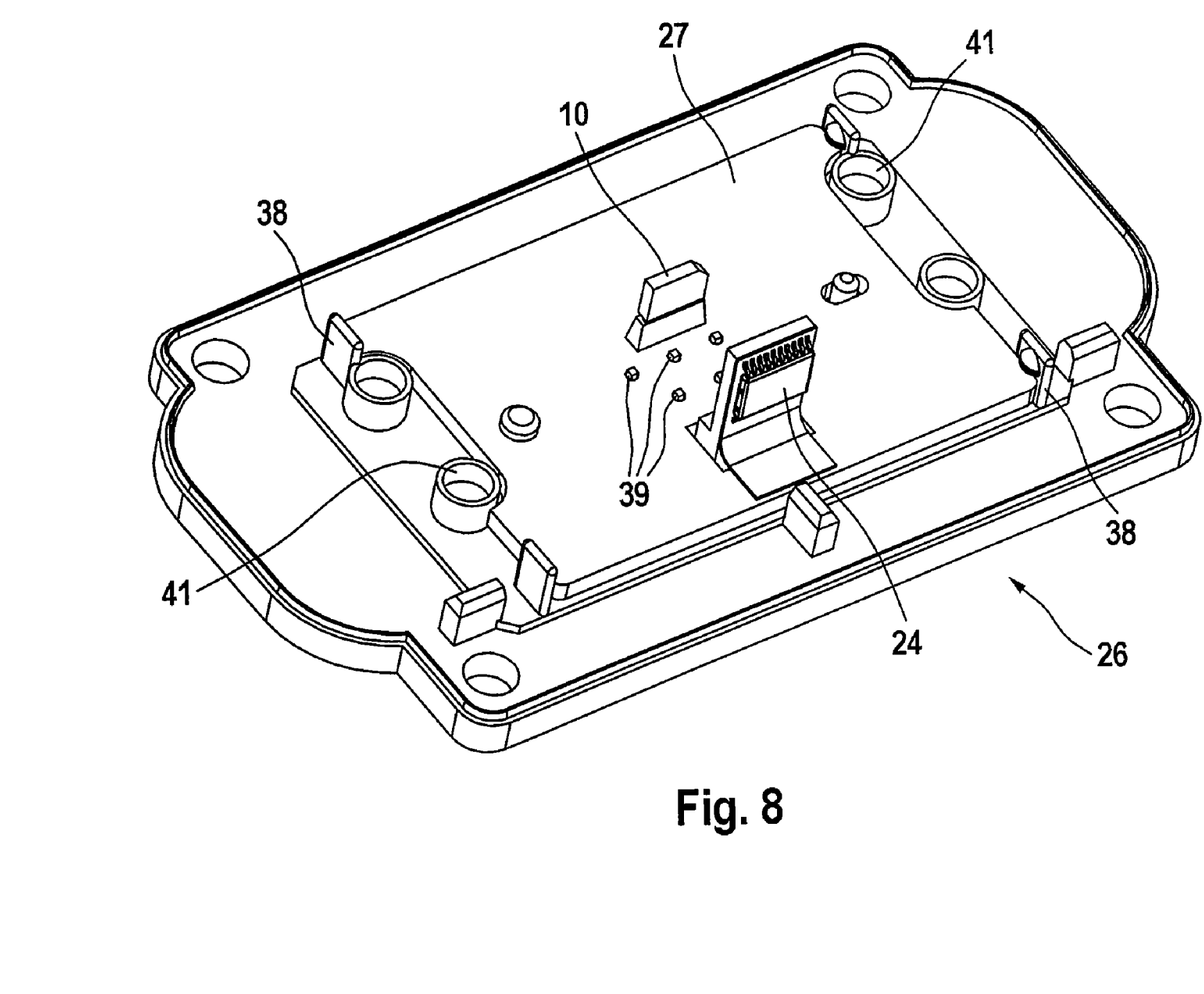
FIG. 8 shows an exemplary housing cover with sensor circuit board.

FIG. 8 depicts first cover 26 embodied by way of example for the housing (not illustrated) of the sensor arrangement, wherein the inner side of this cover can be seen. The cover is embodied as a steel plate, in particular. On the inner side of the cover, by way of example a printed circuit board 27 is fixed and latched in fixing means 38. Printed circuit board 27 or circuit board has two magnetic field sensor elements 10 and 24. Magnetic field sensor element 10 serves for detecting the magnetic field concentrated by the flux concentrators and thus overall for indirectly detecting a torque. Magnetic field sensor element 24 is integrated into an electronic evaluation circuit and is used for detecting an additional, second encoder track (not illustrated) for measuring an angle of rotation. Printed circuit board 27 is connected to external electrical connections (not illustrated) of a connector of the housing by means of press-fitting technology 39. In addition, cover 26 has press-in means 41 embodied and provided for the pressing-in or introduction or completely provided introduction of the expanding elements (not illustrated) into the expanding recesses (not illustrated) of the carrier elements.

Figure 9:
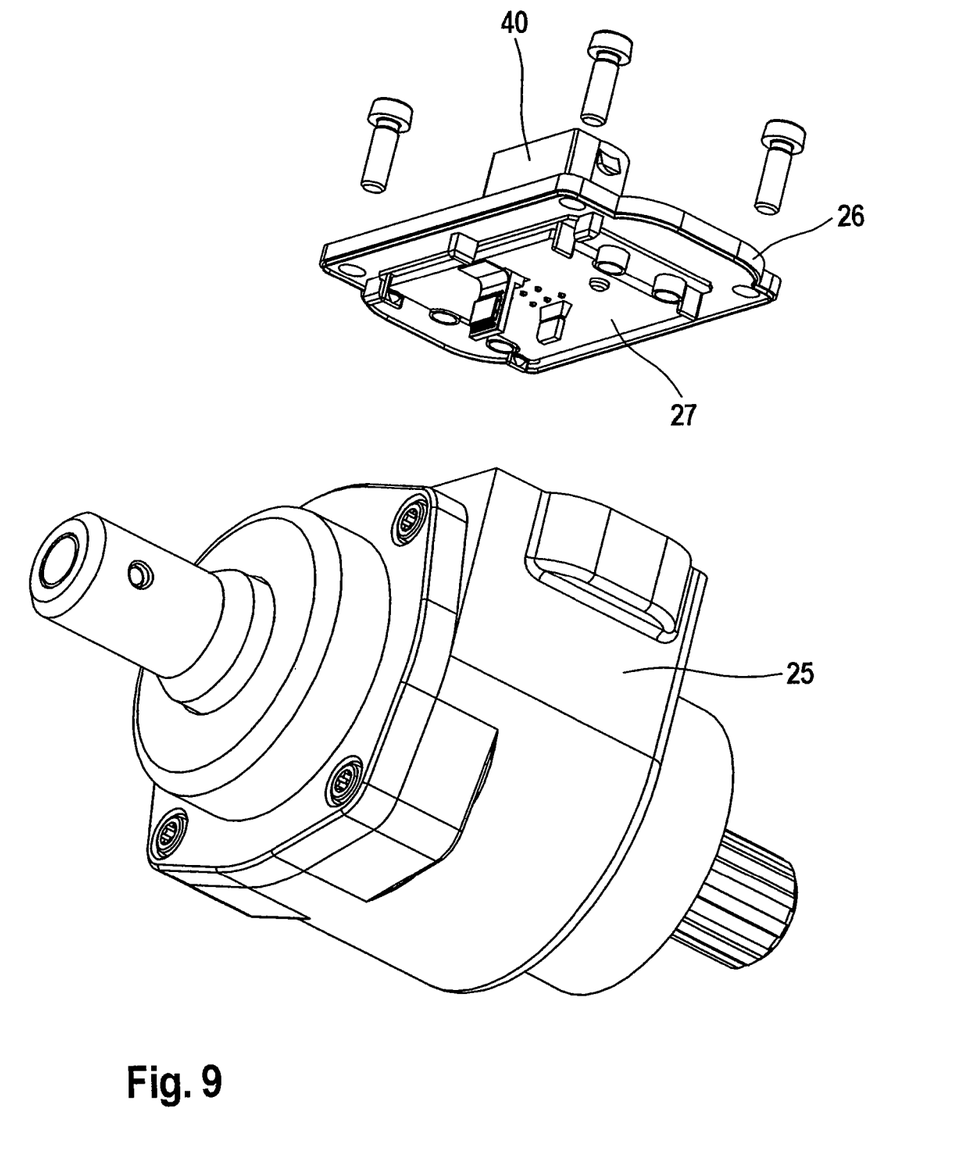
FIG. 9 shows an exemplary embodiment of a sensor arrangement with housing and an assigned cover.

FIG. 9 illustrates an exemplary embodiment of the sensor arrangement with a housing 25, wherein cover 26, which functions as a sensor carrier, is composed of plastic with an injected steel plate for shielding a magnetic field. Cover 26 additionally comprises an embodiment geometry in which, during mounting, the expanding elements or bolts are pressed into the expanding recesses of the carrier elements whereby the centering devices or clips are expanded. Cover 26 has a connector 40 or housing connector 40, in which case, in an exemplary embodiment that is not illustrated, the sensor arrangement is connected directly by a cable. Printed circuit board 27 comprises a combination of a fixed and a flexible printed circuit board, or of a pure flexible printed circuit board, and is therefore also suitable for receiving sensors that are perpendicular to the printed circuit board. Depending on the circuitry outlay, the embodiment as MiD component of the cover or sensor carrier is possible.

For EMC reasons, the housing and the cover are formed from steel or alternatively by way of example from some other magnetically permeable material. A plastic housing with inserts for the screw connections and bearing receptacles is also alternatively provided by way of example.

Figure 10:
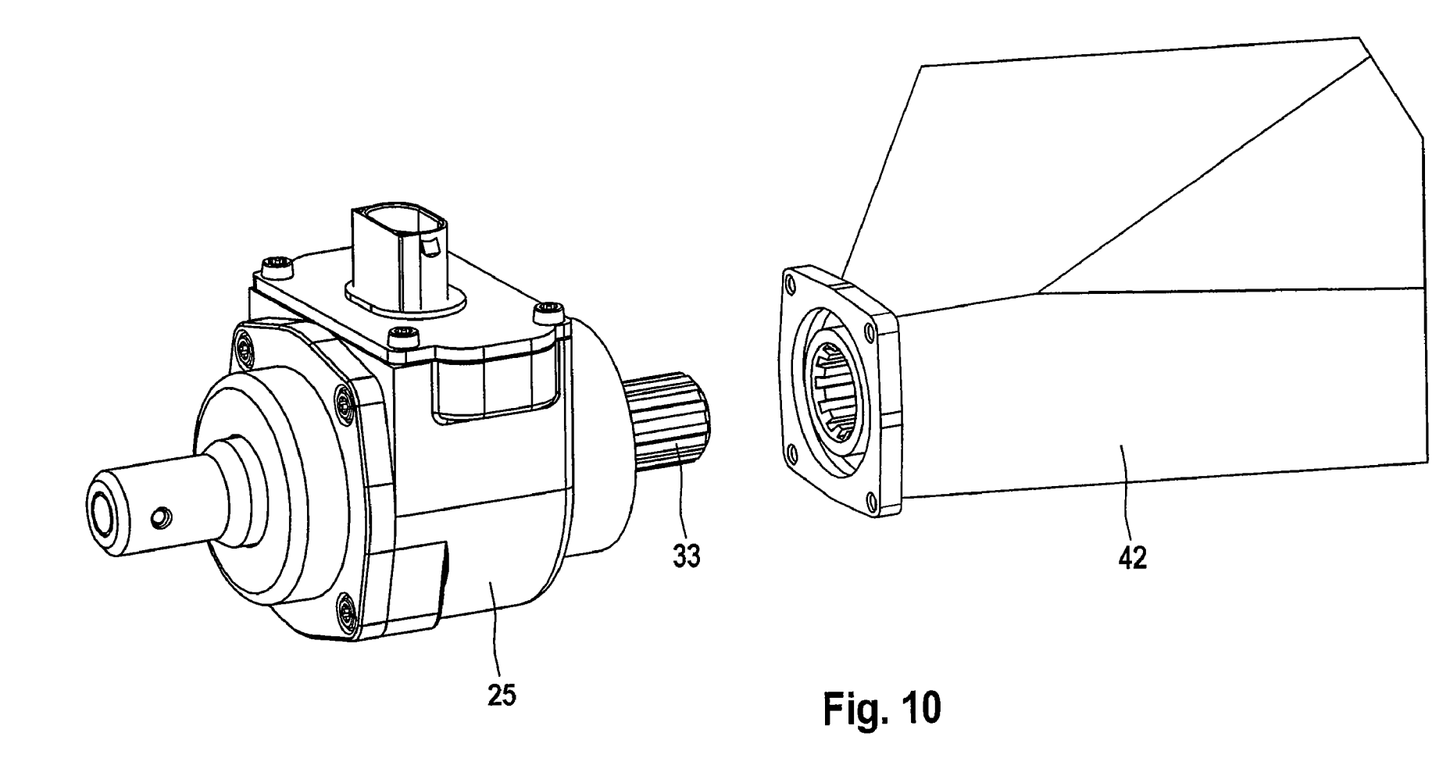
FIG. 10 shows the exemplary coupling of an exemplary sensor arrangement to a steering gear.

The exemplary embodiment of the sensor arrangement that is shown in FIG. 10 forms or is a functionally integrated, housed 25 torque/steering angle sensor system. A possible direct linking on the output side to a steering gear 42 by means of a splined shaft 33 is additionally illustrated. The sensor arrangement or the entire torque/steering angle sensor system comprising housing 25 is embodied by way of example such that it is approximately as large or bulky as a conventional hydraulic part of a steering assistance system.

Figure 11:
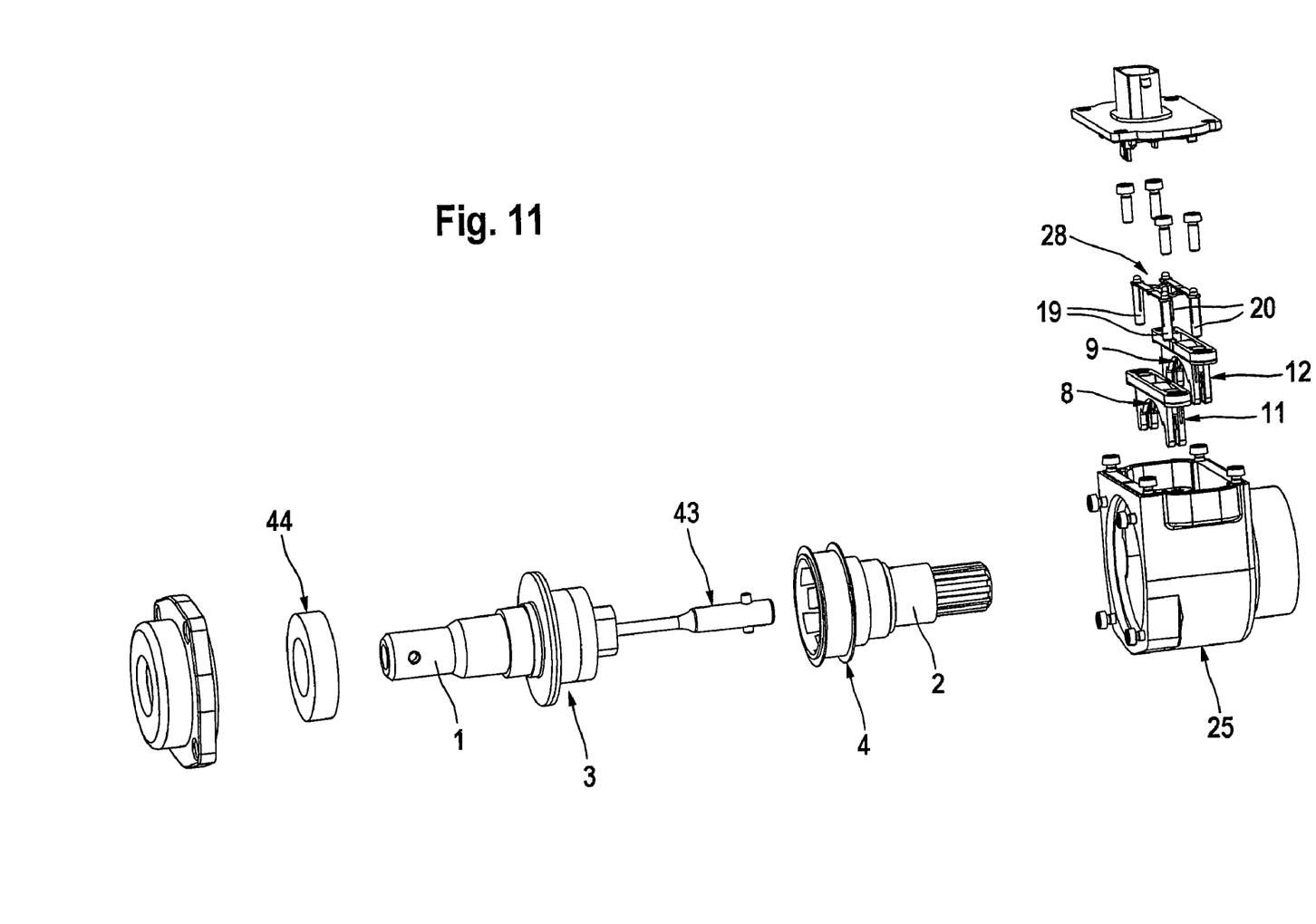
FIG. 11 shows an exemplary embodiment of a sensor arrangement with the individual components to be assembled, which overall forms a total system that is relatively easy to manufacture.

FIG. 11 shows an exemplary sensor arrangement, as a pre-tested finished assembly, which forms a self-contained sensor system which can be assembled relatively easily and which is particularly suitable for incorporation into a steering system. In this case, sleeve-type shaft sections 1, 2, are fixed to both ends of a torsion rod 43, for example by means of bolts. These are connected to housing 25 by means of a bearing 44 and can be externally connected in each case to a further shaft end. A first shaft section 1 carries an encoder assembly 3 or a magnetic encoder having two encoder tracks arranged offset by 90° with respect to one another. Said first shaft section 1 is embodied in such a way that it can be connected to an input shaft (not illustrated). Second shaft section 2 carries a stator 4 or a stator assemblies and is embodied in such a way that it can be connected to an output shaft (not illustrated). The two shaft sections 1, 2 with their attached parts and torsion rod 43 are enclosed by housing 25. Two flux concentrators 8, 9 with carrier elements 11, 12 or two collector assemblies, each comprising an elastic clip with a magnetically permeable collector plate, are fitted into said housing 25. These collector assemblies are respectively assigned by way of example an expanding bolt element 19, 20 or an expanding module 28 comprising expanding bolts connected to one another. These expanding bolt elements are fitted into the respective elastic clip or into expanding recesses of the carrier elements 11, 12 and provide for a defined air gap between the respective flux concentrators and stator elements.

Figure 12:
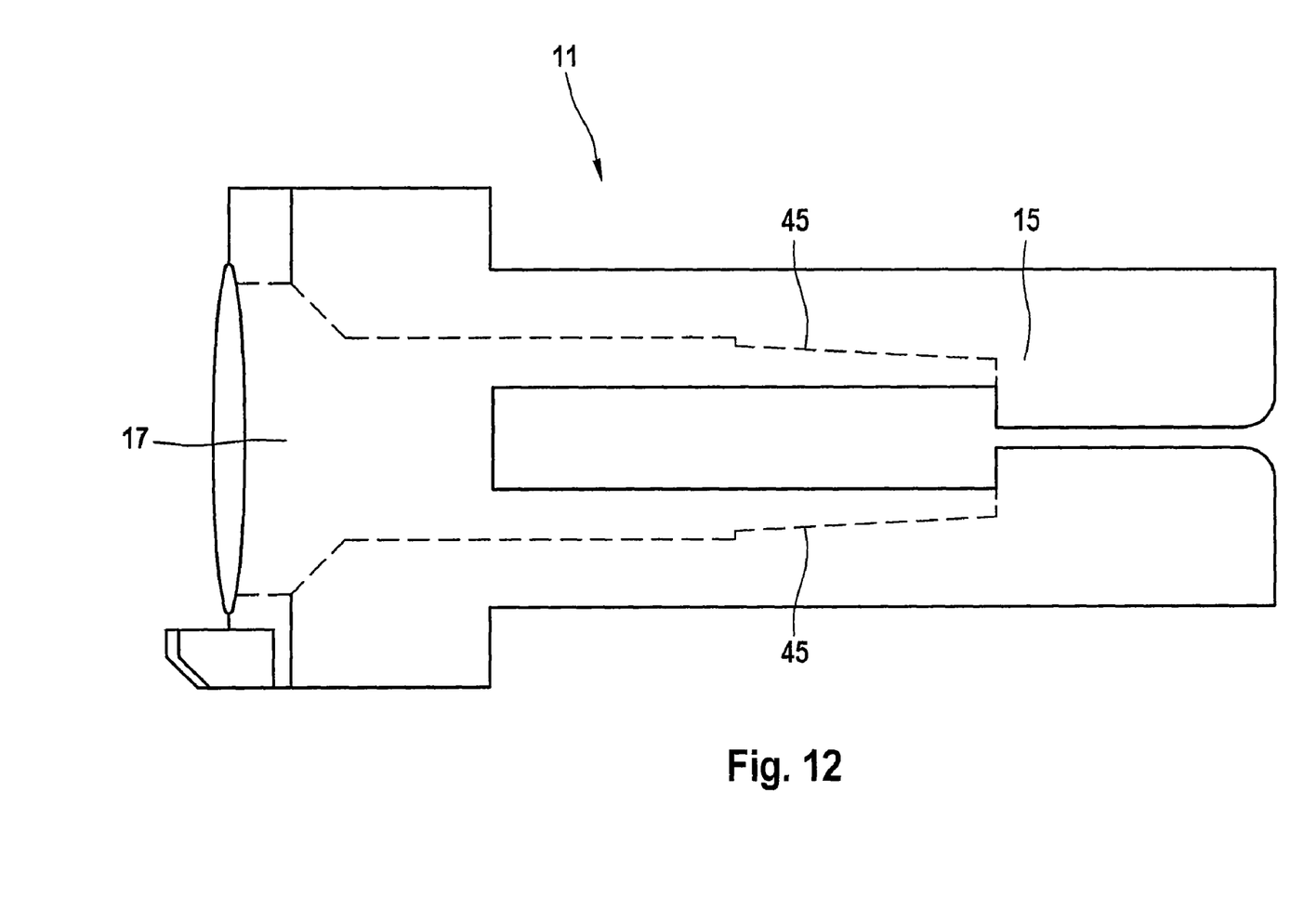
FIG. 12 shows an exemplary carrier element from a side view.

FIG. 12 depicts an exemplary carrier element 11, comprising a centering device 15 and an expanding recess 17, wherein an exemplary embodiment of centering device 15 and expanding recess 17 and also the interaction thereof in particular with an expanding element (not illustrated) is intended to be illustrated. Expanding recess 17 is outlined in the interior by the dashed line tracing and has a or spatial expanding surface 45, which are embodied in oblique fashion. Said expanding surface 45 is arranged at an inner surface of the centering device 15, which is embodied in elastic fashion. By inserting an expanding element into expanding recess 17, the expanding element pressing against the expanding surface 45, centering device 15 is spread apart or widened.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A sensor arrangement for measuring a torque acting on a shaft, wherein the shaft has a first shaft section and a second shaft section and the two shaft sections are configured to be rotated relative to one another, said sensor arrangement comprising:
at least one magnetic encoder arranged on the first shaft section, and
a stator arranged on the second shaft section, wherein the stator has two stator elements, each stator element having protruding fingers, and wherein the stator elements are either respectively or jointly associated with a flux concentrator which conducts a magnetic field to be detected that is generated by the magnetic encoder, either directly or indirectly to at least one magnetic field sensor element, wherein at least one flux concentrator is fixed to a carrier element, wherein at least a portion of the carrier element is composed of an elastic material,
wherein each stator element comprises a radially protruding ring and each of the stator elements is associated with a flux concentrator fixed to a carrier element, wherein the carrier element has at least one centering device embodied such that it can at least partially encompass and align the ring of the associated stator element between stator element and carrier element,
wherein the at least one carrier element has an expanding recess, into which an expanding element is at least partly inserted, wherein the at least one centering device of the carrier element is at least partially widened by the expanding element.

2. The sensor arrangement as claimed in claim 1, wherein the centering device is embodied such that it at least partly encompasses the ring of the respectively assigned stator element such that the centering device and ring are press fit together.

3. The sensor arrangement as claimed in claim 1, wherein the stator elements are connected to one another by a common connecting element composed of injection-molded plastic.

4. The sensor arrangement as claimed in claim 1, wherein the ring and the fingers of a stator element are at least partially formed from soft-magnetic material and the fingers are fixed to the ring and are aligned in a manner protruding from the ring axially with respect to the shaft.

5. The sensor arrangement as claimed in claim 4, wherein the fingers are embodied in a substantially trapezoidal fashion.

6. The sensor arrangement as claimed in at least one of claim 1, wherein the magnetic encoder has at least two encoder tracks and the sensor arrangement has at least two magnetic field sensor elements, wherein the stator is assigned to a first encoder track, and a first magnetic field sensor element is assigned to said stator, and wherein a second magnetic field sensor element is configured for measuring a relative angle of rotation between the two shaft sections and is assigned to a second encoder track.

7. The sensor arrangement as claimed in claim 1, wherein the sensor arrangement further comprises a housing to which the carrier elements are fixed, said housing being at least partially formed from a magnetically permeable material for electromagnetic shielding.

8. The sensor arrangement as claimed in claim 7, wherein the at least one magnetic field sensor element is arranged on an inner side of a cover of the housing of the sensor arrangement.

9. The use of the sensor arrangement as claimed in claim 1 as a torque sensor, an angle sensor, or both, in a steering system of a motor vehicle.

* * * * *